Patented Nov. 1, 1932

1,885,859

UNITED STATES PATENT OFFICE

LUDWIG ROSENSTEIN AND WALTER J. HUND, OF SAN FRANCISCO, CALIFORNIA

PROCESS FOR REFINING VEGETABLE OILS

No Drawing.  Application filed August 21, 1931. Serial No. 558,556.

This invention relates to a process for the refining of natural organic products such as vegetable and animal oils, fats, waxes and the like such as cocoanut oil, cotton seed oil, and fish oil.

More specifically it consists of refining these organic products with alkylolamines and especially ethanolamines or mixtures thereof with ammonia.

The invention possesses numerous advantageous features and objects, some of which will appear in full in the following description in which we have outlined our invention. It is understood that the invention, as defined by the claims, is to be accorded a range of mechanical and chemical equivalents consistent with the state of the prior art.

It is our discovery that the organic materials, can be refined of impurities comprising usually free fatty acids, coloring matter, aldehydes, and other substances, by the use of normally liquid compounds of the group known as alkylolamines of which mono-, di-, and tri-ethanol amines may be considered as the first members as the corresponding methanol compounds are unstable.

These compounds may be considered as the ammonia substitution compounds in which one or more of the hydrogen atoms of the ammonia are replaced with the corresponding number of alkylhydroxyl groups (-ROH).

These compounds may be used as pure substances, as varying mixtures of group-members, or as mixtures of group-members with ammonia. We have found that alkylolamines and ammonia are miscible in all proportions, and such mixtures have in certain cases distinct advantages. In our copending application, Serial No. 531,650, we have described a refining process employing liquid ammonia as a treating agent. Taking into consideration the cost of the liquid ammonia as compared to the cost of alkylolamines and the somewhat superior properties of certain alkylolamines as refining agents, it would be apparent that the most advantageous process of refining a vegetable oil may involve the use of the proper mixture of the two.

The utilization of alkylolamines alone or with the ammonia is to our knowledge a new and useful improvement in the existing art. The alkylolamines are in many cases better solvents than ammonia for fatty acids and other impurities while the glycerides, waxes etc. are generally less soluble therein than in ammonia; and as their boiling points are much higher than that of ammonia the use of pressure equipment may be avoided. Moreover, alkylolamines may be readily recovered, as will appear in some detail later.

Of the alkylolamines we have found the mono-, di-, and tri-ethanolamines to be preferable for vegetable oil refining. The glycerides of fatty acids, as well as the esters of the monohydric alcohols and fatty acids are very insoluble in mono, di-, or tri-ethanol amines or mixtures thereof, while the free fatty acids, coloring matter, aldehydic and nitrogen containing bodies are very soluble in these alkylolamines, and can be removed from the vegetable oils by extraction with a predetermined quantity of the extracting agent and separation of the two layers thereby formed. The extracting agents may be readily recovered by distillation, preferably in vacuum and with the aid of some superheated steam, whereby the ethanolamine soaps are dissociated, and ethanolamines are separated from the extracted impurities and recovered with high efficiency. The recovered alkylolamines may contain some undissociated soap without deleterious effects on the process. The refined oil after separation from the ethanolamine layer may still contain a small quantity thereof. To insure complete removal thereof from the oil the latter may be heated in vacuum and blown with an inert gas, or still better, contacted with water which dissolves and thus removes ethanolamines, or compounds formed by reactions between ethanolamines and fatty acids or other impurities.

While mono-, di-, or tri-ethanolamines may be used individually or as a mixture, we prefer to operate with substantially monoethanolamine because in general its boiling point is lower than that of the "di-", or "tri"-compounds, so that it can be recovered more readily at a lower temperature of distillation and without decomposition.

As an example of how the process of our invention may be utilized in connection with an oil, such as cotton seed oil, we shall set forth the following by way of illustration.

Raw cotton seed oil containing coloring matter and other impurities common to the cotton seed oil, as well as about 8% free fatty acids, is treated at about 40° C. with approximately one-third of its volume of the monoethanolamine. The higher temperature is chosen largely for the purpose of hastening the separation of the system into two phases; this takes place more rapidly the lower the viscosities of the involved liquids. The two phases are allowed to separate, and it will be found that the oil phase is now of the color generally specified by U. S. Pharmacopœia for "sweet oil" and is neutral and pleasant to the taste.

The monoethanolamine layer is transferred to a suitable equipment wherein high vacuum may be maintained, say about 25-30 mm. mercury; heat is applied and a current of superheated steam having a temperature of about 120° C. is passed through the liquid. The vapors pass through a rectifying column of the usual type wherein substantially pure monoethanolamine is separated from water (resulting from the condensation of steam) by fractionation, the water being moved at the top of the column and the monoethanolamine at the bottom. The latter is returned to the system for further extraction, while the fatty acid and other extracted impurities remain in the still and are available for recovery if desired.

This process of refining vegetable oil and the like may be operated as a continuous cycle wherein the material to be purified is treated countercurrently with the alkylolamine extracting agent.

It will be obvious that the temperature of treating must be so chosen that the material to be purified is in the liquid state. For cocoanut oil this temperature is about 35° C. It is also advantageous to choose the temperature suitable for rapid separation of phases, this depending on the viscosities and the difference in specific gravities of phases.

It is to be understood that the extracting agents intended for use here, such as monoethanolamine, when commercially manufactured are not pure substances but represent mixtures in which the desired substance predominates to various degrees for different cases.

As commercially obtained, the ethanolamines may contain 5%, approximately, of water; the presence of which in such amounts is not detrimental to the process. Larger amounts in many cases cause excessive emulsification and consequent difficulty in separating the layers and should be avoided. The actual amount of water which may be tolerated depends on the character of the material undergoing treatment. In general we prefer to work with substantially anhydrous alkylolamines.

We claim as our invention:

1. In a process of purifying a substance of the class consisting of oils, fats and waxes of the ester type, the step which comprises contacting the material to be treated with an alkylolamine.

2. In a process of purifying a substance of the class consisting of oils, fats and waxes of the ester type, the step which comprises contacting the material to be treated with an alkylolamine at an elevated temperature at which said material is a liquid.

3. The process of purifying a substance of the class consisting of oils, fats and waxes of the ester type which comprises extracting the impurities from the material to be treated by contacting it with an alkylolamine, physically separating said alkylolamine containing extracted impurities from the material being treated, and treating said material to complete the removal of alkylolamine therefrom.

4. The process of purifying a substance of the class consisting of oils, fats and waxes of the ester type which comprises extracting the impurities from the material to be treated by contacting it with an alkylolamine, physically separating said alkylolamine containing extracted impurities from the material being treated and heating said material under reduced pressure.

5. The process of purifying a substance of the class consisting of oils, fats and waxes of the ester type which comprises extracting the impurities from the material to be treated by contacting it with an alkylolamine, physically separating said alkylolamine containing extracted impurities from the material being treated, heating said material, and blowing it with an inert gas.

6. The process of purifying a substance of the class consisting of oils, fats and waxes of the ester type which comprises extracting the impurities from the material to be treated by contacting it with an alkylolamine, physically separating said alkylolamine containing extracted impurities from the material being treated, water washing the latter, and physically separating the water phase therefrom.

7. The process of purifying a substance of the class consisting of oils, fats anl waxes of the ester type which comprises extracting the impurities from the material to be treated by contacting it with an alkylolamine, physically separating said alkylolamine containing extracted impurities from the material being treated, and recovering alkylolamine by distillation.

8. The cyclic process of purifying a substance of the class consisting of oils, fats and waxes of the ester type at a temperature at which material to be purified is a liquid, by treating a continuous flow of the material to be purified with a flow of alkylolamine, physically separating the latter together with dissolved impurities from the material being treated; recovering the alkylolamine and returning the same to the process.

9. In a process of purifying a substance of the class consisting of oils, fats and waxes of the ester type, the step which comprises contacting the material to be treated with an ethanolamine.

10. In a process of purifying a substance of the class consisting of oils, fats and waxes of the ester type, the step which comprises contacting the material to be treated with an ethanolamine at an elevated temperature at which said material is a liquid.

11. The cyclic process of purifying a substance of the class consisting of oils, fats and waxes of the ester type at a temperature at which material to be purified is a liquid, by treating a continuous flow of the material to be purified with a flow of ethanolamine, physically separating the latter together with dissolved impurities from the material being treated, recovering the ethanolamine and returning the same to the process.

12. In a process of purifying a substance of the class consisting of oils, fats and waxes of the ester type, the step which comprises contacting the material to be treated with monoethanolamine.

13. In a process of purifying a substance of the class consisting of oils, fats and waxes of the ester type, the step which comprises contacting the material to be treated with a mixture of alkylolamine and ammonia.

14. The cyclic process of purifying a substance of the class consisting of oils, fats and waxes of the ester type at a temperature at which material to be purified is a liquid, by treating a continuous flow of the material to be purified with a flow of a mixture of alkylolamine and ammonia, physically separating said mixture together with dissolved impurities from the material being treated; recovering the alkylolamine and ammonia and returning the same to the process.

15. In a process of purifying a substance of the class consisting of oils, fats and waxes of the ester type, the step which comprises contacting the material to be treated with a mono-alkylolamine.

16. In a process of purifying a substance of the class consisting of oils, fats and waxes of the ester type, the step which comprises contacting the material to be treated with a di-alkylolamine.

17. In a process of purifying a substance of the class consisting of oils, fats and waxes of the ester type, the step which comprises contacting the material to be treated with a tri-alkylolamine.

In testimony whereof, we have hereunto set our hands.

LUDWIG ROSENSTEIN.
WALTER J. HUND.